United States Patent
Jin et al.

(10) Patent No.: US 8,930,570 B1
(45) Date of Patent: Jan. 6, 2015

(54) PROCESSING VIDEO IN ADVANCE TO MAINTAIN VIDEO SYNCHRONIZATION

(75) Inventors: Bangfei Jin, Shanghai (CN); Chin-Yee Lin, Los Gatos, CA (US)

(73) Assignee: VisualOn, Inc., San Jose, CA (US)

( * ) Notice: Subject to any disclaimer, the term of this patent is extended or adjusted under 35 U.S.C. 154(b) by 567 days.

(21) Appl. No.: 13/013,221

(22) Filed: Jan. 25, 2011

(51) Int. Cl.
*G06F 15/16* (2006.01)

(52) U.S. Cl.
USPC .......................... 709/234; 709/231

(58) Field of Classification Search
CPC .............................. H04N 19/00127
See application file for complete search history.

(56) References Cited

U.S. PATENT DOCUMENTS

| | | | | |
|---|---|---|---|---|
| 5,471,576 | A * | 11/1995 | Yee | 715/203 |
| 5,642,171 | A * | 6/1997 | Baumgartner et al. | 348/515 |
| 5,995,751 | A * | 11/1999 | Kosugi et al. | 717/100 |
| 6,240,459 | B1 * | 5/2001 | Roberts et al. | 709/232 |
| 6,262,776 | B1 * | 7/2001 | Griffits | 348/512 |
| 6,680,753 | B2 * | 1/2004 | Kahn | 348/512 |
| 2009/0135918 | A1 * | 5/2009 | Mak-Fan et al. | 375/240.28 |
| 2011/0141355 | A1 * | 6/2011 | Boak | 348/513 |
| 2011/0221960 | A1 * | 9/2011 | Glaznev et al. | 348/515 |

* cited by examiner

*Primary Examiner* — Krista Zele
*Assistant Examiner* — Matthew Lindsey
(74) *Attorney, Agent, or Firm* — Van Pelt, Yi & James LLP (57) ABSTRACT

A system for processing a media data stream comprises a processor and a memory. The processor is configured for determining that video processing of a media data stream reaches a lag criterion with respect to an associated audio processing of the media data stream. The processor is further configured to skip video processing of a portion of the media data stream such that video processing achieves a lead criterion with respect to the associated audio processing of the media data stream. The memory is coupled to the processor and is configured to provide the processor with instructions.

19 Claims, 8 Drawing Sheets

PROCESSING VIDEO IN ADVANCE TO MAINTAIN VIDEO SYNCHRONIZATION

BACKGROUND OF THE INVENTION

Processing media (e.g., audio or video) is a very popular application on computers, cellular phones, and embedded computing devices, but requires a great deal of computer power. Video media is typically stored at a high data rate (e.g., bits per second of processing), requiring considerable computing power to process. If a computer cannot process video media at the appropriate data rate, the video processing rate may lag slightly compared with the desired video processing rate. This lag may be tolerable, as a viewer may not be able to observe a slightly incorrect video processing rate. However, if the video media has accompanying audio media, a lag in the video processing rate becomes more problematic. Processing audio typically requires much less computing power than processing video, and therefore a computer will likely be able to process audio at the desired data rate even when it is not able to process video at the desired rate. This discrepancy in the processing rates leads the audio and video to become out of sync, which is easily detectable to a viewer.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or, a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing a media data stream comprises a processor and a memory. The processor is configured for determining that video processing of a media data stream reaches a lag criterion with respect to an associated audio processing of the media data stream. The processor is further configured to skip video processing of a portion of the media data stream such that video processing achieves a lead criterion with respect to the associated audio processing of the media data stream. The memory is coupled to the processor and is configured to provide the processor with instructions.

There are three types of pictures (or frames) used in video compression: I-frames, P-frames, and B-frames. An I-frame comprises an 'Intra-coded picture', in effect a fully-specified picture, like a conventional static image file, and is referred to herein as an "intra frame." P-frames and B-frames hold only part of the image information, so they need less space to store than an I-frame, and thus improve video compression rates.

A P-frame ('Predicted picture') holds only the changes in the image from the previous frame. For example, in a scene where a car moves across a stationary background, only the car's movements need to be encoded. The encoder does not need to store the unchanging background pixels in the P-frame, thus saving space. A B-frame ('Bi-predictive picture') saves even more space by using differences between the current frame and both the preceding and following frames to specify its content. Both P-frames and B-frames are referred to herein as "inter frames."

Processing or decoding video in advance to maintain video synchronization is disclosed. During processing using a typical video processing technique, the video processing lag varies from 0 (e.g., audio and video are in sync) to a peak lag time (e.g., video lags behind the audio by the peak lag time) that depends on maximum video processing rate and the duration between video intra frames. Processing video in advance comprises processing a video intra frame and displaying it a predetermined amount before the correct time. Displaying the intra frame before the correct time is analogous to a negative video processing lag time. After the intra frame has been displayed, inter frames are processed and displayed as rapidly as possible, up to the desired processing rate, analogously to the typical video processing technique. When video processing reaches the predetermined time before next video intra frame, any remaining inter frames left to processed and display before the next intra frame are skipped, and the next intra frame is displayed. If the inter frames following the next intra frame are processed and displayed at a rate slower than the desired rate, the processing lag time increases from the negative value it starts out at, equal to the amount of time the intra frame is displayed in advance, and it increases until the next intra frame is displayed. The peak lag value using this technique, reached immediately before the inter frames are skipped and the next intra frame is displayed, is equal to the peak lag value using a typical technique minus the amount of time the intra frame is displayed in advance. If the amount of time the intra frame is displayed in advance is greater than half the peak lag time using the typical technique, the peak lag time using this technique will be when the first intra frame is displayed after skipping, and be equal to the amount of time the intra frame is displayed in advance. The maximum peak lag time reduction occurs in the situation when the amount of time the intra frame is displayed in advance is equal to half the peak lag time using the typical technique, and the resulting peak lag time is equal to half the peak lag time using the typical technique.

Typical video encoding schemes include intra frames, which self-contain all image data for the frame, and inter frames, which contain predictive data from other frames. The video data typically includes a small number of intra frames, occurring with frequencies (e.g., the frequency does not need to be a fixed rate in a clip) that vary according to different video encoder settings, and a much larger number of inter frames, that occur between the intra frames. Lag in the video processing rate is dealt with by displaying a intra frame at its correct time and then displaying inter frames as rapidly as possible, up to the desired processing rate. At the time of the next intra frame, any remaining inter frames left to display before the next intra frame are skipped, and the intra frame is displayed. The offset between audio and video thus peaks immediately before the intra frame, and is reduced to zero at the intra frame. If the peak offset is too large, a viewer will be able to observe that audio and video are not in sync, the video is not being processed promptly.

Figure 1:
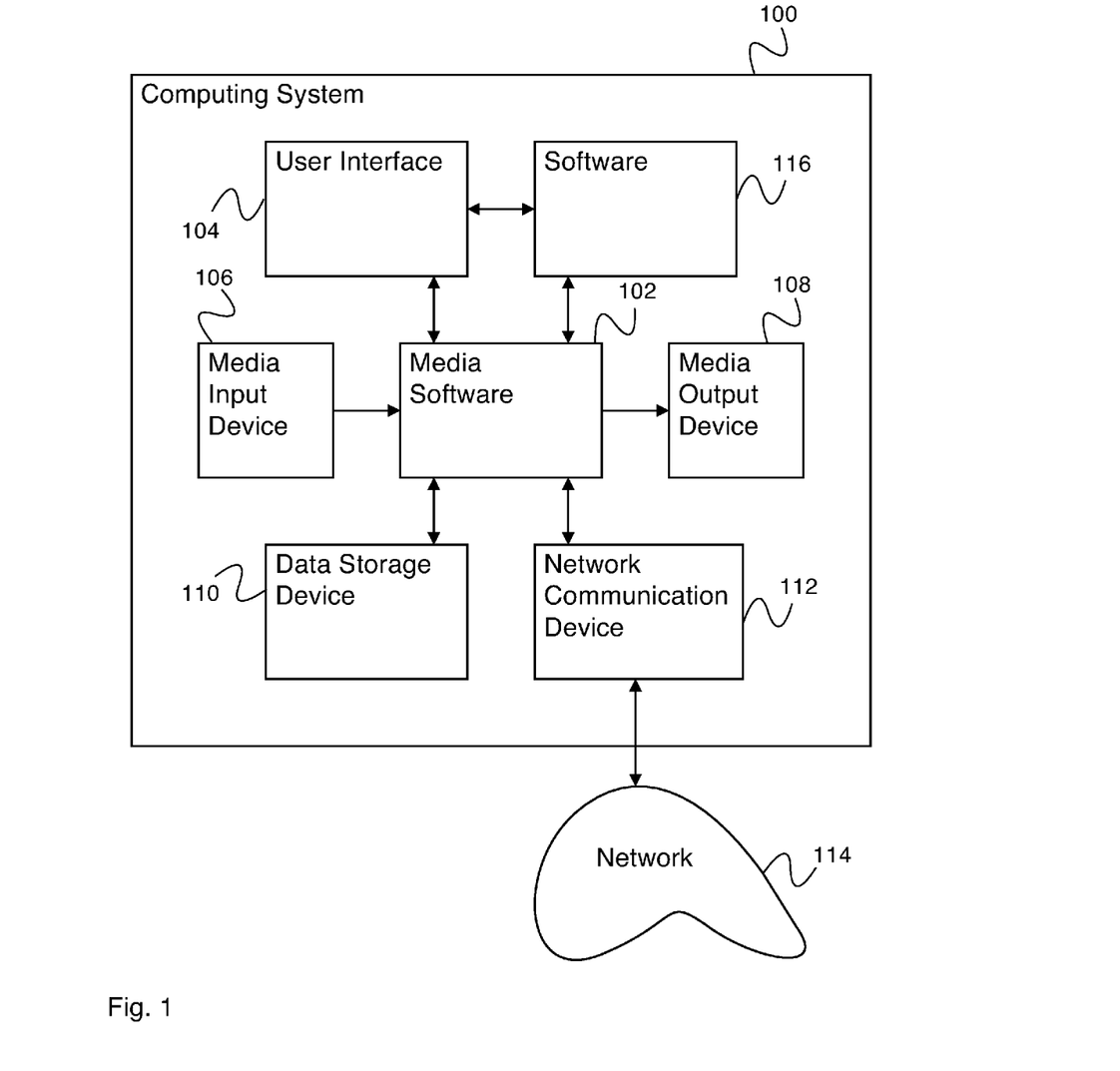
FIG. 1 is a block diagram illustrating an embodiment of a computing system for processing video in advance to maintain video synchronization.

FIG. 1 is a block diagram illustrating an embodiment of a computing system for processing video in advance to maintain video synchronization. In various embodiments, computing system 100 comprises a computer, a mobile phone or other mobile computing system, an embedded computing system, or any other appropriate computing system. In the example shown, computing system 100 comprises media software 102. Media software 102 communicates with user interface 104, media input device 106, media output device 108, data storage device 110, network communication device 112, and software 116. User interface 104 comprises a user interface for allowing a computing system user to interact with media software 102 and other software 116. In some embodiments, user interface 104 comprises a device for presenting information and choices to a user (e.g., a display) and a device for receiving information from a user (e.g., a mouse, a keyboard, etc.). Media input device 106 comprises a device for receiving media input (e.g., a stored file, a transferred file, a stream from a network, etc.) (and relaying it to software on computing system 100 (e.g., media software 102). Media output device 108 comprises a device for projecting media output (e.g., a video display, a speaker, etc.) received from software on computing system 100 (e.g., media software 102). Data storage device 110 comprises a device for storing data (e.g., media data, media metadata, system information data, user data, network data, or any other appropriate data) and receiving data from and delivering data to software on computing system 100 (e.g., media software 102). Network communication device 112 comprises a device for communicating data (e.g., media data, media metadata, system information data, user data, network data, or any other appropriate data) with a network (e.g., network 114) and receiving data from and delivering data to software on computing system 100 (e.g., media software 102). In various embodiments, network 114 comprises a local area network, a wide area network, a wired network, a wireless network, the Internet, a fiber network, a storage area network, a cellular network, or any other appropriate network enabling communication. Software 116 comprises other software present on computing system 100. In various embodiments, software 116 comprises system software, media software, data processing software, user interface software, or any other appropriate software on computing system 100.

In some embodiments, computing system 100 comprises a mobile phone that includes media software coupled to one or more components, where the media software coupled to the one or more components is capable of loading a data file—for example, a video or audio file—and processing the data file to present the data file to a user. In various embodiments, the data file is presented to the user as a video stream displayed using a color or black and white display or an audio stream output using a speaker or headphones or broadcast to a wireless connected audio output device (e.g., a Bluetooth connected head set). In some embodiments, processing the data file includes decompressing or decrypting the data file—for example, processing the data file compatible with a format such as MPEG-1/MPEG-2/MPEG-4/H.264 (e.g. a format specified by the Moving Picture Experts Group), MP3 (e.g., MPEG-1 audio layer 3), AAC (Advanced Audio Coding), Windows Media Audio, Windows Media Video, media containers such as AVI (e.g., audio video interleaved container format), ASF (e.g., advanced systems format for streaming, an audio/video container), WAV (e.g., waveform audio file format), or MOV (e.g., a quick time multimedia format). In various embodiments, data storage device 110 comprises a solid state memory (e.g., a random access memory), a magnetic memory, an optical memory, or any other appropriate data storage device.

Computing system 100 comprises a computing system for processing audio and video. In various embodiments, audio and video are stored in data storage device 110, received from network communication device 112, or accessed in any other appropriate way. In various embodiments, one or more of user interface 104, media input device 106, media output device 108, data storage device 110, network communication device 112, or software 116 are not present in computing system 100. In some embodiments, computing system 100 comprises a computing system for processing video in advance to maintain video synchronization. In some embodiments, computing system 100 comprises a system for processing a media data stream comprising: a processor configured for determining that video processing of a media data stream reaches a lag criterion with respect to an associated audio processing of the media data stream, and for skipping video processing of a portion of the media data stream such that video processing achieves a lead criterion with respect to the associated audio processing of the media data stream; and a memory coupled to the processor and configured to provide the processor with instruction. In some embodiments, a processor is configured for determining that video processing of a media data stream reaches a lag criterion with respect to an associated audio processing of the media data stream and for skipping video processing of a portion of the media data stream such that video processing achieves a lead criterion with respect to the associated audio processing of the media data stream comprises media software 102. In some embodiments, a memory is coupled to the processor and is configured to provide the processor with instruction comprises data storage device 110.

Figure 2A:
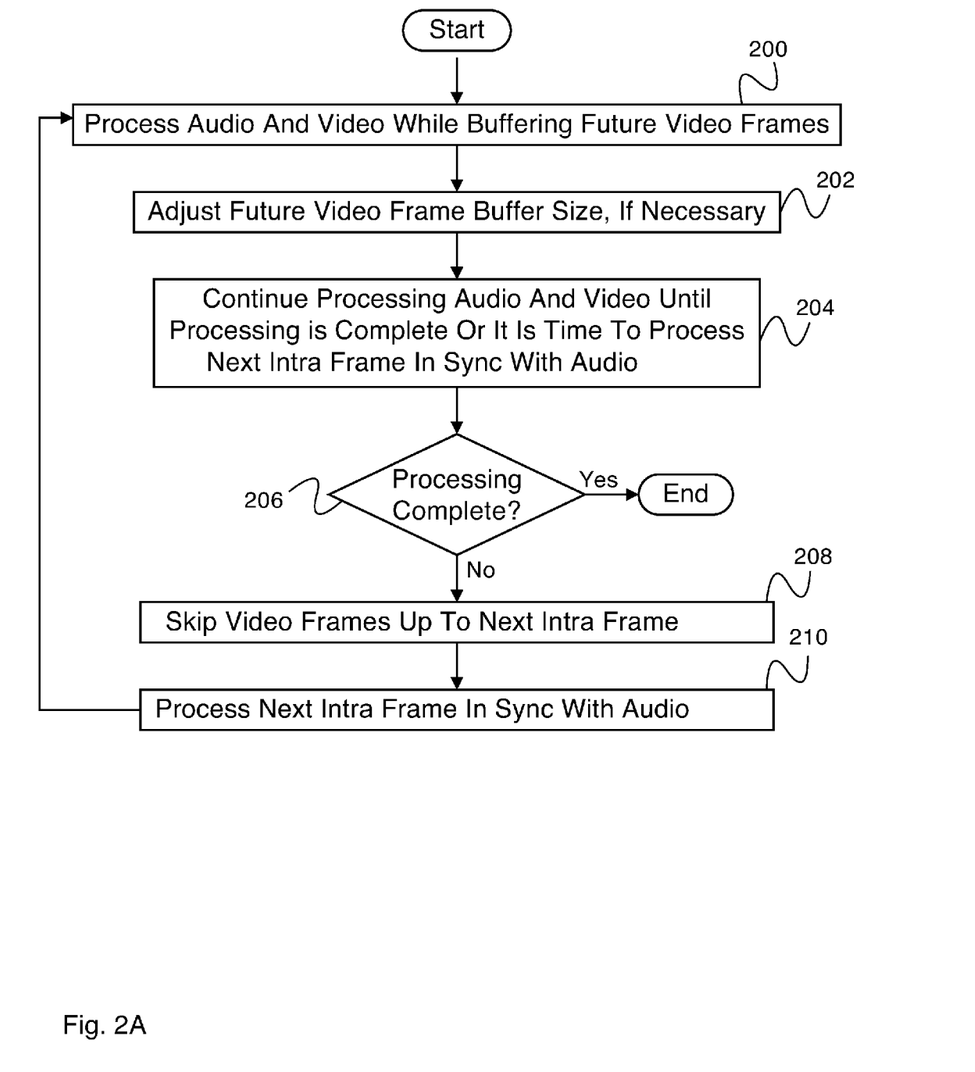
FIG. 2A is a flow diagram illustrating an embodiment of a typical process for processing audio and video.

FIG. 2A is a flow diagram illustrating an embodiment of a typical process for processing audio and video. The process of FIG. 2A is a typical process that maintains video synchronization without processing video in advance. In some embodiments, the process of FIG. 2A is carried out by media software (e.g., media software 102 of FIG. 1) on a computing system (e.g., computing system 100 of FIG. 1). In the example shown, in 200, audio and video are processed while buffering future video frames. Both the audio and video are processed at their maximum possible rate up to the desired processing rate. In some embodiments, bandwidth of audio data is typically low enough that it can be reliably processed at the desired rate. In some embodiments, bandwidth of video data is typically high enough that it cannot reliably be processed at the desired rate. If video data is processed at a rate slower than the desired rate, the video data being processed at a given instant will lag behind the audio data being processed at a given instant. In 202, the future video frame buffer size is adjusted, if necessary. Future video frames are buffered so that the next intra frame location can be scanned, or an intra frame time table and their data locations in the file can be built at the beginning from some file container headers. The media software can then access to all video frames from the frame currently being processed to the frame intended to be processed at the current time (e.g., the frame in sync with the audio data currently being processed). By scanning the data, we can reuse the buffer and move forward on the data in files. Also a time vs. file location table of all intra frames can be used as well.

In 204, audio and video processing is continued until the processing is complete or until it is time to process the next video intra frame in sync with the audio. As processing continues, if the video processing lags behind the desired processing rate, the video will become out of sync with the audio. The sync offset will grow as time passes. The future video frame buffer is monitored for the next intra frame or the intra frames are located in a table that includes a time or file location. When processing is complete or it is time to process the next intra frame in sync with the audio, control passes to 206. In 206, if processing is complete, the process ends. If processing is not complete, then it is time to process the next intra frame. In 208, video frames up to the next intra frame are skipped. In 210, the next intra frame is processed in sync with the audio. Control then returns to 200, and processing continues until complete. Synchronization between audio and video cycles in this way as processing continues, the video lagging behind the audio until an intraframe occurs, and skipping frames to advance the video relative to the audio.

Figure 2B:
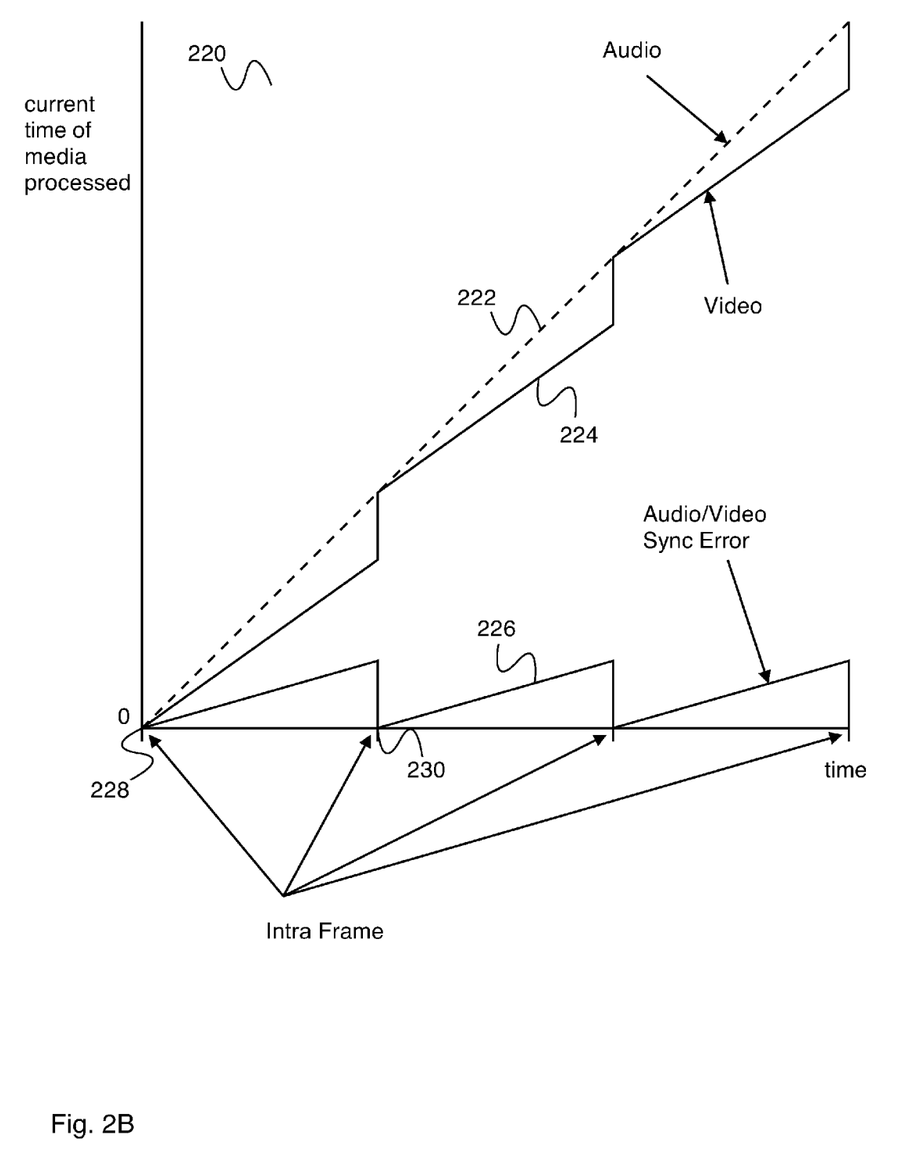
FIG. 2B is a diagram illustrating an embodiment of audio processing rate, video processing rate, and audio/video sync error over time.

FIG. 2B is a diagram illustrating an embodiment of audio processing rate, video processing rate, and audio/video sync error over time. In some embodiments, the audio processing rate of FIG. 2B is achieved using the process of FIG. 2A. The horizontal axis represents the current time, and the vertical axis represents the current time of media being processed. A straight line with a slope of 1 (e.g., horizontal traversal at the same rate as vertical traversal) indicates that media is processed at the "real time" rate, one second of media processed in one second of real time. A line below a slope of 1 indicates that media is processed slower than real time, and a line above a slope of 1 indicates that media is processed faster than real time. Line 222 represents audio processing. Audio typically is encoded such that it can be processed in real time by a typical processor, so line 222 has a slope of 1.

Line 224 represents video processing. Processing starts with the audio and video in sync at intra frame 228. In the example shown, the processor is not able to process video in real time, so it lags behind the audio processing, and line 224 has a slope less than 1. Assuming the video and audio are both processed at a constant rate, the gap between the audio and video grows linearly as time passes. When it is time for intra frame 230, the video processing jumps ahead (represented by the vertical portion of line 224 at the time of intra frame 230), skipping an appropriate number of inter frames, to resume synchronization with the audio. This process repeats, as the video lags behind the audio and then catches up at the third and fourth intra frames shown.

Line 226 represents the synchronization error between audio and video. It is calculated by subtracting the video current processing time from the audio current processing time. The synchronization error grows linearly over time and is reduced to zero at each intra frame. Its peak value occurs immediately before the intra frame, and is equal to the difference in the audio processing rate and the video processing rate, multiplied by the time between intra frames.

In some embodiments, the synchronization error grows non-linearly over time as video processing rates depend on the inter or intra frame data.

Figure 3:
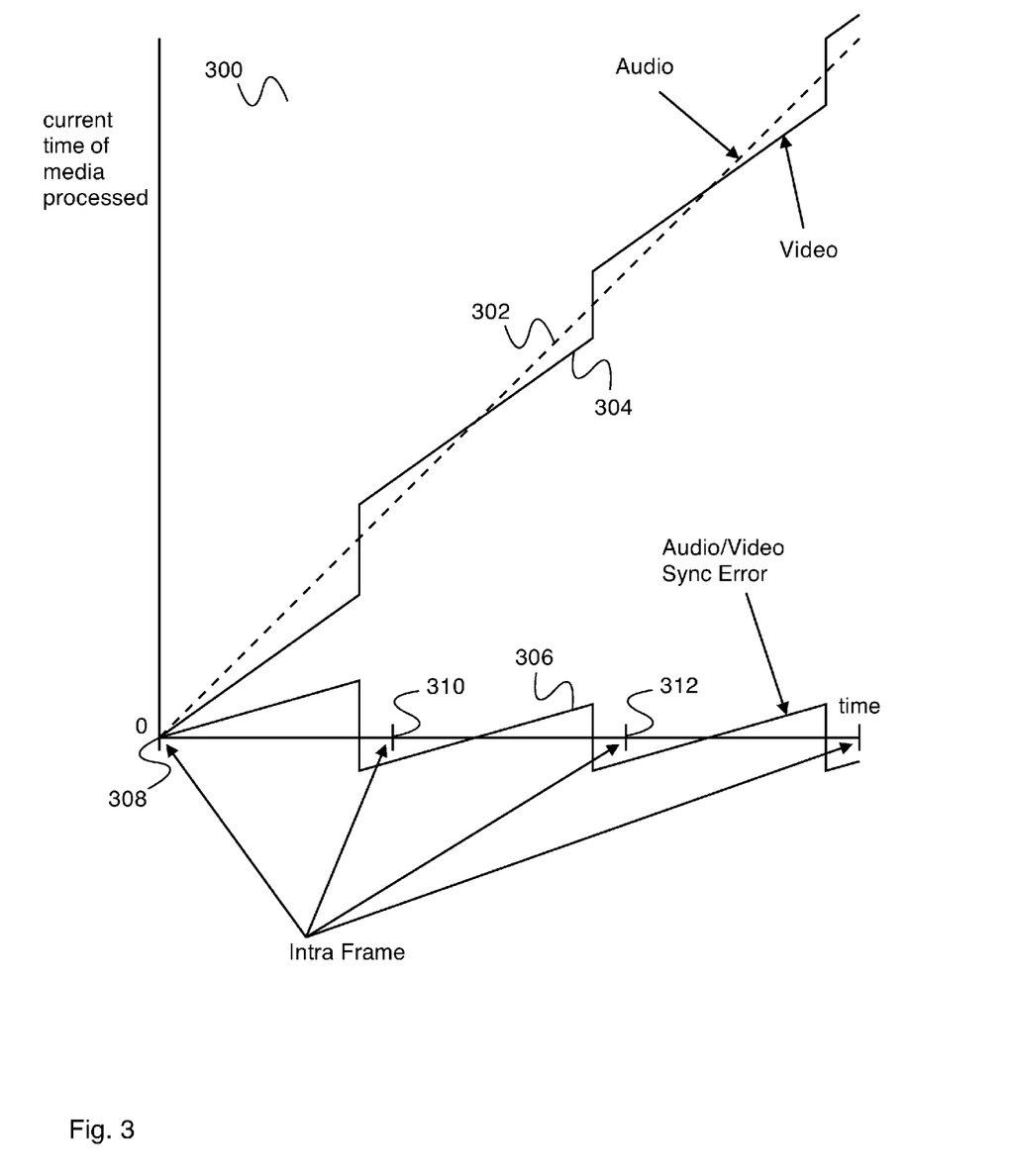
FIG. 3 is a diagram illustrating an embodiment of audio processing rate, video processing rate, and audio/video sync error over time, using a process including processing video in advance to maintain video synchronization.

FIG. 3 is a diagram illustrating an embodiment of audio processing rate, video processing rate, and audio/video sync error over time, using a process including processing video in advance to maintain video synchronization. The horizontal axis represents the current time, and the vertical axis represents the current time of media being processed. Line 302 represents audio processing. Audio typically is encoded such that it can be processed in real time by a typical processor, so line 302 has a slope of 1.

Line 304 represents video processing. Processing starts with the audio and video in sync at intra frame 308. In the example shown, the processor is not able to process video in real time, so it lags behind the audio processing, and line 304 has a slope less than 1. Assuming the video and audio are both processed at a constant rate, the gap between the audio and video grows linearly as time passes. Similarly to the typical process illustrated in FIG. 2B, the video processing jumps ahead (represented by the vertical portion of line 304 prior to intra frame 310) to process the next intra frame (e.g., intra frame 310), skipping an appropriate number of inter frames. However, unlike the process illustrated in FIG. 2B, this jump occurs prior to the correct time to process intra frame 310, by a predetermined amount. Thus, the audio and video are not in sync at the time the intra frame is processed, but the video leads the audio. This effectively gives the video a head start, to compensate for its lag in processing rate. Eventually the lag in the video processing rate causes the video to become in sync with the audio for an instant, after which point the video processing lags the audio again. The video jumps ahead again prior to the correct time to process intra frame 312, again putting it ahead of the audio.

Line 306 represents synchronization error between video processing and audio processing. It is calculated by subtracting the video current processing time from the audio current processing time. The synchronization error grows linearly over time and is reduced to a negative value when each intra frame is processed, equal to the amount of time early the intra frame is processed. The peak value of line 306 occurs immediately before the jump for intra frame 310, as the video processing does not have the advantage of processing video in advance during the first cycle, e.g., the audio and video start out synchronized at time 0. The peak value of synchronization error in cycles after the first cycle occurs immediately before the jump prior to intra frame 312, as well as immediately before the jump prior to later intra frames. There is also a peak negative value of synchronization error which occurs immediately after the jump prior to each intra frame, and is equal to amount of time early that the intra frame is processed.

In some embodiments, video processing and playback between intra frames is not linear. For example, the playback increases in rate, decrease in rate, or increase and decreases in rate. In some embodiments, the video processing jump occurs when a lag criterion is met. In various embodiments, the lag criterion comprises a peak video lag time, a peak video lag rate, a minimum time until the next intra frame, or any other appropriate lag criterion. In various embodiments, a predetermined video duration is skipped, a video duration determined from the video lag is skipped, a video duration to achieve a predetermined video lead time is skipped, a video duration to achieve a video lead time determined from the video lag is skipped, or any other appropriate video duration is skipped. In some embodiments, the jump happens from a current frame to a "future" intra frame, where the "future" intra frame is the one or more intra frames ahead of the current frame in the video stream.

Figure 4:
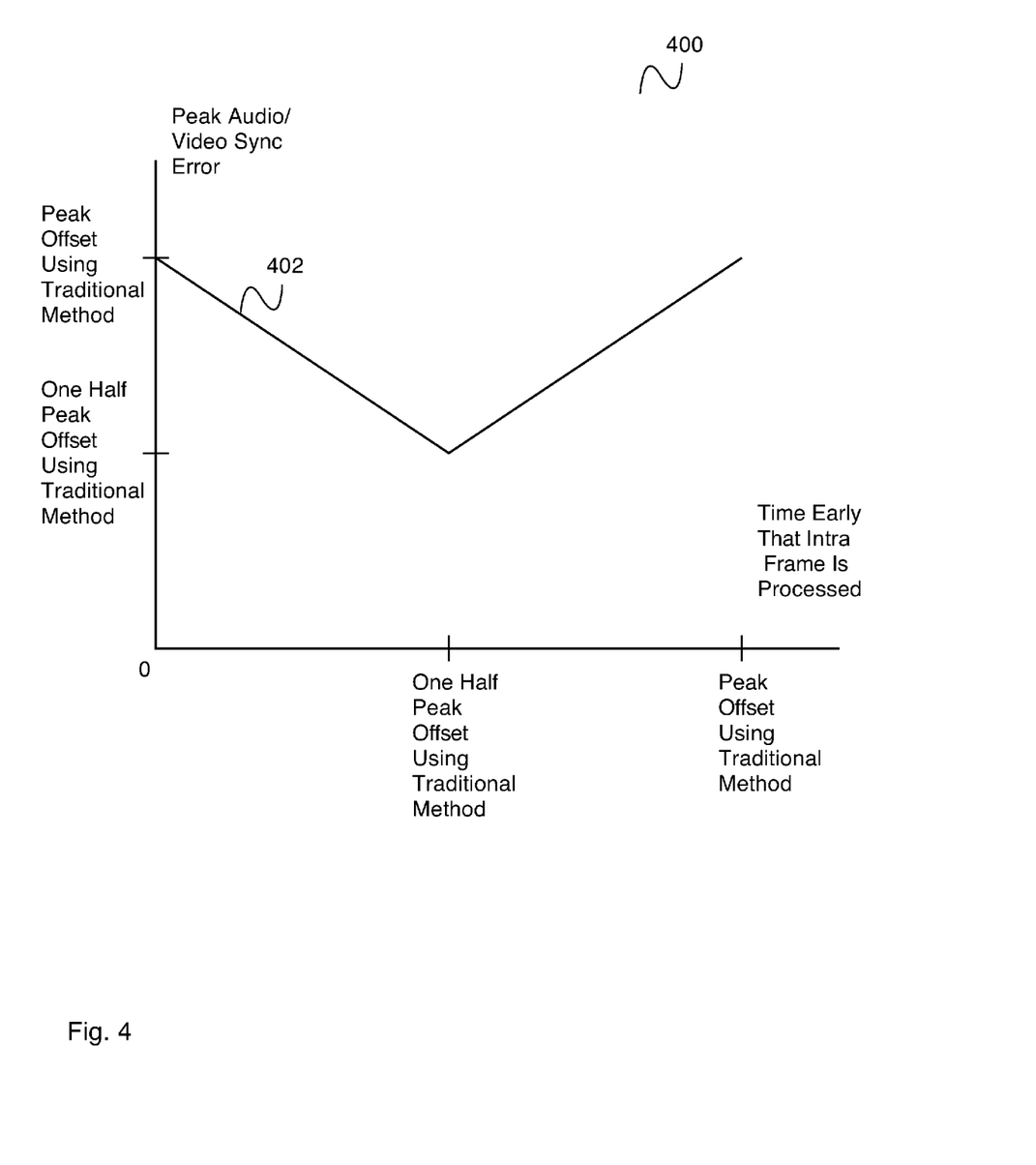
FIG. 4 is a diagram illustrating an embodiment of the relationship between peak synchronization error between audio and video and the amount of time early that an intra frame is processed.

FIG. 4 is a diagram illustrating an embodiment of the relationship between peak synchronization error between audio and video and the amount of time early that an intra frame is processed. In some embodiments, the relationship between peak synchronization error of FIG. 4 is based at least in part on using the process that achieves what is shown in FIG. 3. In the example shown, the amount of time early that an intra frame is processed is shown on the horizontal axis, and the peak synchronization error is shown on the vertical axis. Line 402 represents peak synchronization error. The left portion of line 402, representing an intra frame processing time early by less than one half of the peak offset using the traditional processing method (e.g., the processing method shown in FIG. 2A), comprises a peak synchronization offset value equal to the positive peak synchronization offset value during processing (e.g., the magnitude of the positive peak offset value is greater than the magnitude of the negative peak offset value). The right portion of line 402, representing an intra frame processing time early by greater than one half of the peak offset using the traditional processing method (e.g., the processing method shown in FIG. 2A), comprises a peak synchronization offset value equal to the negative peak synchronization offset value during processing (e.g., the magnitude of the negative peak offset value is greater than the magnitude of the positive peak offset value). This diagram indicates that as the amount of time that the intra frame is processed early increases, the positive peak synchronization offset is reduced and the negative peak synchronization offset is increased. The magnitude of the peak audio/video sync error decreases until the magnitudes of the positive and the negative peak offsets are equal, at which point the peak audio/video sync error increases. The minimum value is thus the point when positive and negative peak offsets are equal, occurring when the intra frame is processed early by one half the peak offset value using the traditional processing method. An algorithm to determine the time early to process intra frames will process them early by one half the peak offset using the traditional processing method. Processing video in advance in this way divides the offset equally between the audio leading the video and the video leading the audio.

In some embodiments, other criteria are used to determine the time early that the intra frame should be processed other than minimizing the peak synchronization error between audio and video. For instance, it is typical that a synchronization error between audio and video is less perceptible to a human (e.g., a larger error is imperceptible) when the video leads the audio than when the audio leads the video. This may cause a designer to determine that the processing algorithm yields the best quality media when the intra frame is processed earlier than would be indicated as optimal on the diagram of FIG. 4, skewing the offset towards the video leading the audio. In some embodiments, the amount of time early that the intra frame is processed is chosen to be greater than or equal to the peak offset value using the traditional processing method, causing all of the offset to be in the direction of the video leading the audio.

Figure 5:
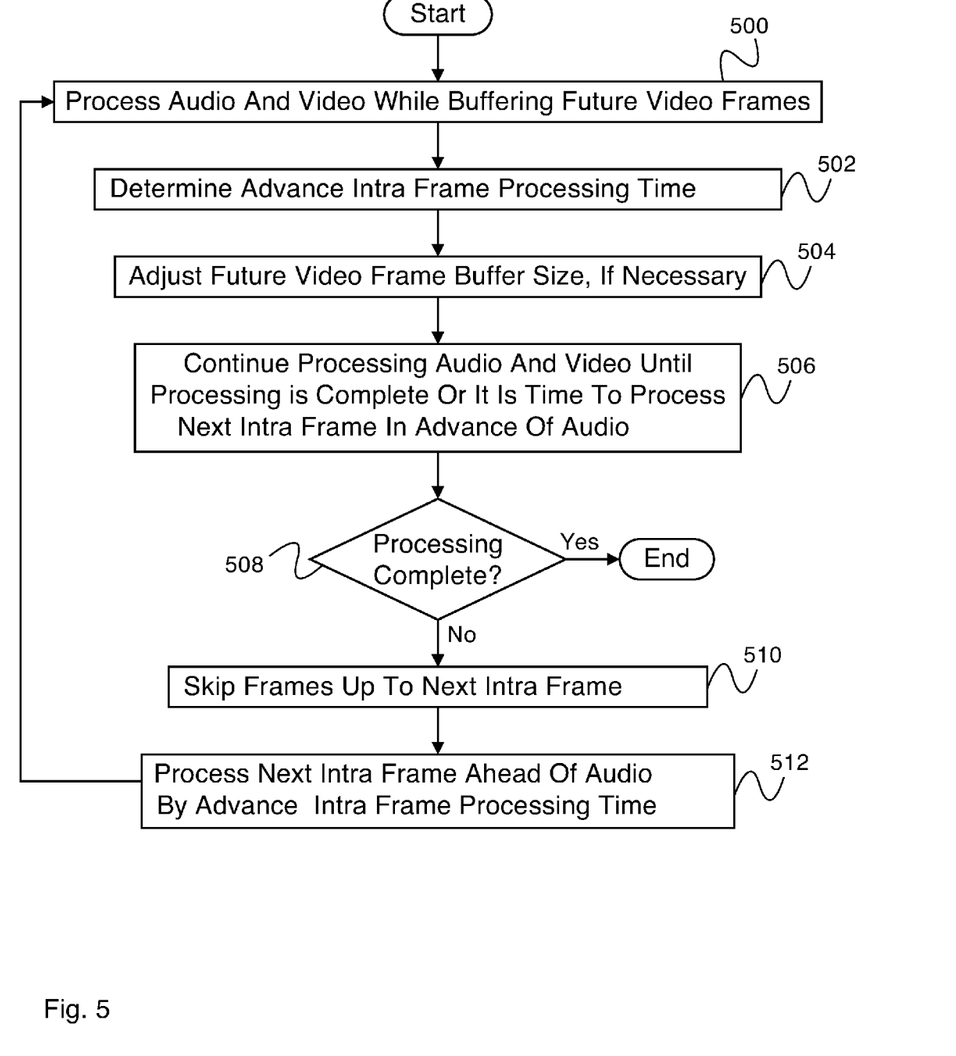
FIG. 5 is a flow diagram illustrating an embodiment of a process for processing audio and video, maintaining video synchronization by processing video in advance.

FIG. 5 is a flow diagram illustrating an embodiment of a process for processing audio and video, maintaining video synchronization by processing video in advance. In some embodiments, the process of FIG. 5 is carried out by media software (e.g., media software 102 of FIG. 1) on a computing system (e.g., computing system 100 of FIG. 1). In the example shown, in 500, audio and video are processed while buffering future video frames. For example, the intra frame file locations and/or times are stored in a table as the video media stream is buffered or preprocessed. Both the audio and video are processed at their maximum possible rate up to the desired processing rate. In some embodiments, bandwidth of audio data is typically low enough that it can be reliably processed at the desired rate. In some embodiments, bandwidth of video data is typically high enough that it cannot reliably be processed at the desired rate. If video data is processed at a rate slower than the desired rate, the video data being processed at a given instant will lag behind the audio data being processed at a given instant. In 502, the advance intra frame processing time is determined. In various embodiments, the advance intra frame processing time is determined to minimize the peak synchronization offset between audio and video, to minimize the perceptibility of the synchronization offset between audio and video, to cause the video to lead the audio at all times, or by any other appropriate criteria.

In 504, the future video frame buffer size is adjusted, if necessary. Future video frames are buffered so that the media software has access to all video frames from the frame currently being processed to the frame ahead of the frame intended to be processed at the current time by the advance intra frame processing time (e.g., the frame ahead of the frame in sync with the audio data currently being processed by the advance intra frame processing time). In some embodiments, a table is created during the buffering of the video stream to store intra frame locations and/or times within the video stream so that the table can be used to skip ahead during playback in the event that there is a lag between the video and audio processing of the video stream.

In 506, audio and video processing is continued until the processing is complete or until it is time to process the next video intra frame in advance of the audio. As processing continues, if the video processing lags behind the desired processing rate, the video will become out of sync with the audio. The sync offset will grow as time passes. The future video frame buffer is monitored for the next intra frame. When processing is complete or it is time to process the next intra frame in advance of the audio, control passes to 508. In 508, if processing is complete, the process ends. If processing is not complete, then it is time to process the next intra frame. In 510, video frames up to the next intra frame are skipped. In 512, the next intra frame is processed ahead of the audio by the advance intra frame processing time, and the video then leads the audio. Control then returns to 500, and processing continues until complete. Synchronization between audio and video cycles in this way as processing continues, the video leading the audio at the beginning of an intra frame, and gradually falling behind and lagging the audio until the determined next intra frame processing time occurs, then skipping frames to lead the audio again at each intra frame.

Figure 6:
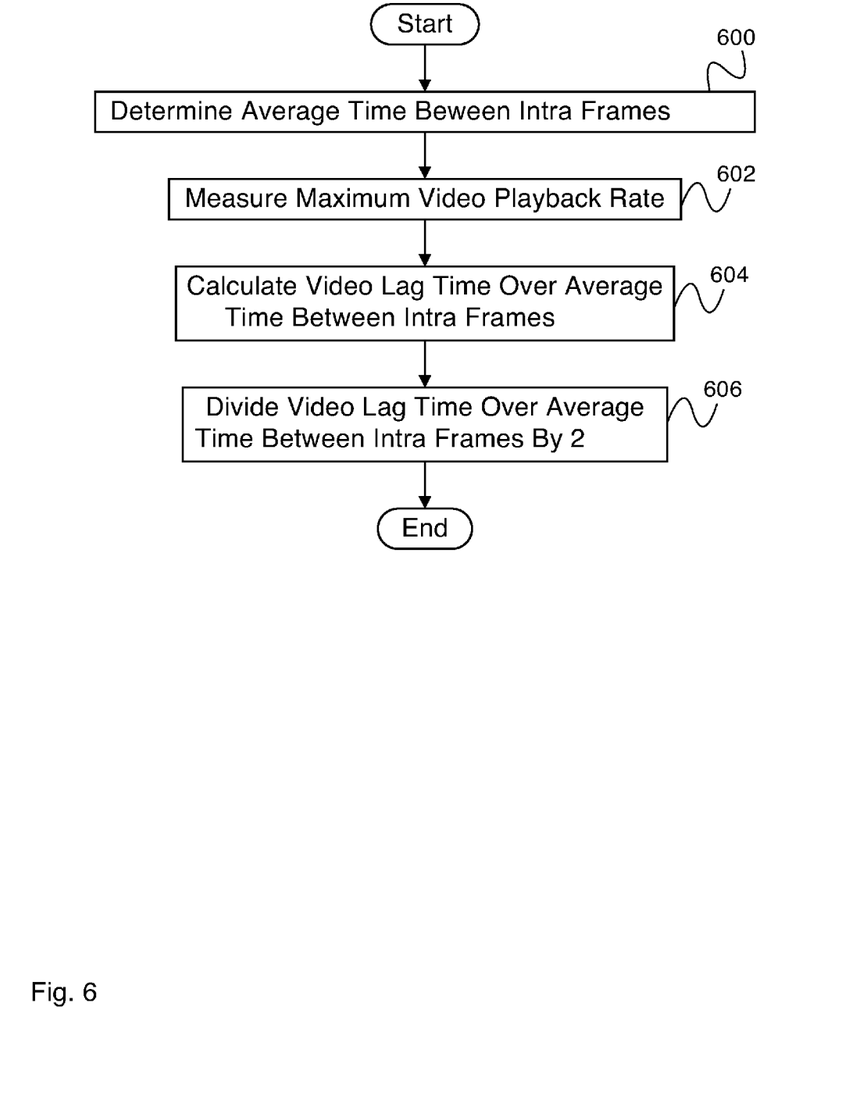
FIG. 6 is a flow diagram illustrating an embodiment of a process for determining advance intra frame processing time.

FIG. 6 is a flow diagram illustrating an embodiment of a process for determining advance intra frame processing time. In some embodiments, the process of FIG. 6 implements 502 of FIG. 5. In the example shown, in 600, the average time between intra frames is determined. In various embodiments, the average time between intra frames is determined by measuring the time between intra frames over the course of processing, by reading information encoded into the video, by scanning the video for intra frames before playing it back, by making a guess of the average time between intra frames based on the bit rate and resolution of the video and the processing power of the system, or by any other appropriate method. In 602, the maximum video processing rate is determined. In various embodiments, the maximum video processing rate is determined by processing video and measuring the rate of processing, by evaluating the computing hardware and estimating the maximum video processing rate, by evaluating historical data on the maximum video processing rate, by making a guess of the maximum video processing rate, or by any other appropriate method. In 604, the video lag time over the average time between intra frames is calculated. In some embodiments, the video lag time over the average time between intra frames is calculated by determining the video lag rate and multiplying the video lag rate by the average time between intra frames. The video lag rate is calculated by subtracting the maximum video processing rate from the desired video processing rate (e.g., typically a rate of one second of processing per second of time). In 606, the video lag time over the average time between intra frames is divided by 2. The resulting value is used as the advance intra frame processing time. In some embodiments, the advance intra frame is determined by dividing the video lag time over the average time between intra frames by a value other than 2.

Figure 7:
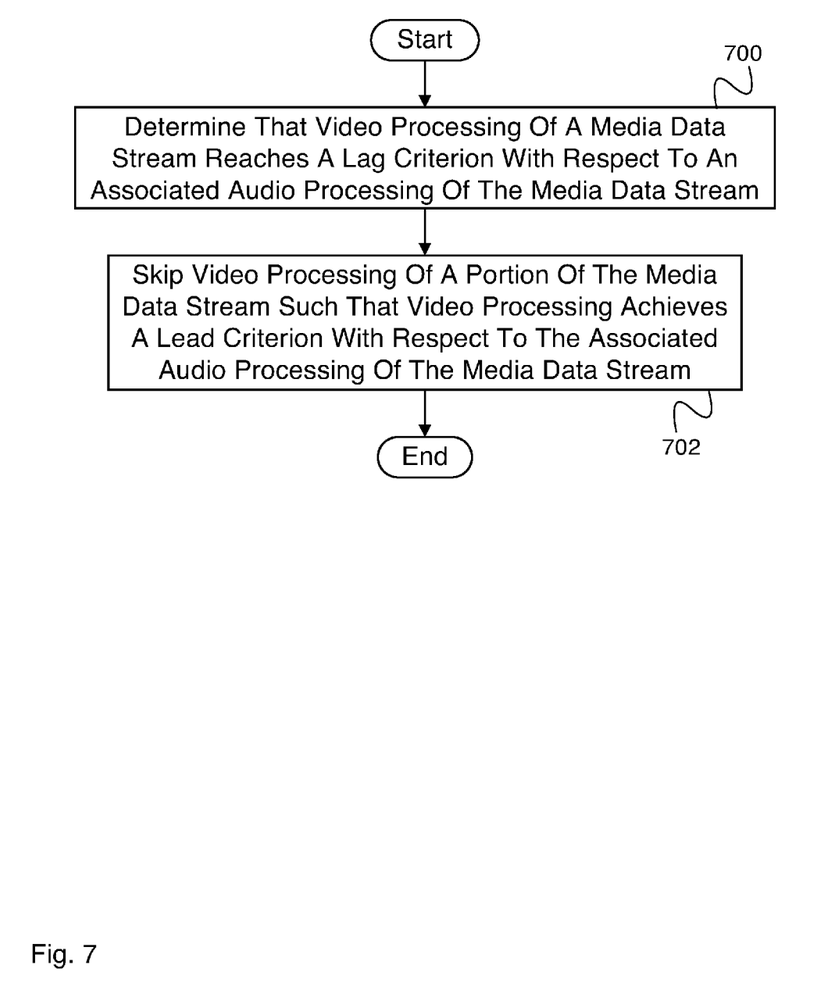
FIG. 7 is a flow diagram illustrating an embodiment of a process for maintaining video synchronization by processing video in advance.

FIG. 7 is a flow diagram illustrating an embodiment of a process for maintaining video synchronization by processing video in advance. In some embodiments, the process of FIG. 5 is carried out by media software (e.g., media software 102 of FIG. 1) on a computing system (e.g., computing system 100 of FIG. 1). In the example shown, in 700, it is determined that video processing of a media data stream reaches a lag criterion with respect to an associated audio processing of the media data stream. In various embodiments, the video lag is determined by comparing the currently processed video frame with the currently processed audio frame (e.g., a video playback time and an audio playback time), by comparing the time of the currently processed video frame with an absolute time reference (e.g., a real time clock), by measuring the average video processing rate and/or computing video lag as time passes, or by any other appropriate method. In various embodiments, the lag criterion comprises a peak video lag time, a peak video lag rate, a minimum time until the next intra frame, or any other appropriate lag criterion.

In 702, video processing of a portion of the media data stream is skipped such that video processing achieves a lead criterion with respect to the associated audio processing of the media data stream. In various embodiments, a predetermined video duration is skipped, a video duration determined from the video lag is skipped, a video duration to achieve a predetermined video lead time is skipped, a video duration to achieve a video lead time determined from the video lag is skipped, or any other appropriate video duration is skipped. In various embodiments, the lead criterion comprises a predetermined video lead time, a video lead time determined from the video lag time, a video lead time determined from the video lag rate, a video lead time determined from the time until the next intra frame, a lead criterion accounting for the average time between intra frames, or any other appropriate lead criterion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a media data stream comprising:
a processor configured to:
  determine a lead criterion, wherein the lead criterion comprises a negative synchronization offset that places video processing ahead of an associated audio processing of a media data stream;
  video process a current intra frame from the media data stream with the lead criterion with respect to an associated audio processing of the media data stream, wherein the media data stream includes at least one inter frame between the current intra frame and a future intra frame;
  determine that video processing of the media data stream at a current video processing rate reached a lag criterion with respect to the associated audio processing of the media data stream, wherein the lag criterion comprises a positive synchronization offset that places the video processing behind the associated audio processing of the media data stream;
  determine an advance intra frame processing time, wherein the determining of the advance intra frame processing time comprises:
    determine an average time between two consecutive intra frames;
    determine a video lag rate relating to a video processing rate and an audio processing rate; and
    calculate the advance intra frame processing time as the video lag rate times half the average time between two consecutive intra frames;
  skip video processing of a portion of the media data stream such that video processing recovers the lead criterion with respect to the associated audio processing of the media data stream, wherein the video processing portion of the media data stream skipped is up to the next intra frame so that the next intra frame is processed ahead of the associated audio processing by the advance intra frame processing time, wherein the skipping of the video processing is performed at a time before a next intra frame, wherein the video processing recovers the lead criterion without a corresponding adjustment to the current video processing rate, and wherein the skipped portion of the media data stream includes at least one unprocessed inter frame before the future intra frame; and
  video process the future intra frame; and
a memory coupled to the processor and configured to provide the processor with instruction.

2. A system as in claim 1, wherein determining that video processing of the media stream reaches a lag criterion includes comparing a video playback time with an audio playback time.

3. A system as in claim 1, wherein determining that video processing of the media stream reaches a lag criterion includes comparing a timestamp of a video frame with a real time clock.

4. A system as in claim 1, wherein determining that video processing of the media stream reaches a lag criterion includes measuring an average video processing rate.

5. A system as in claim 1, wherein determining that video processing of the media stream reaches a lag criterion includes computing video lag.

6. A system as in claim 1, wherein the lag criterion comprises a peak video lag time.

7. A system as in claim 1, wherein the lag criterion comprises a peak video lag rate.

8. A system as in claim 1, wherein the lag criterion comprises a minimum time until the next intra frame.

9. A system as in claim 1, wherein the portion of the video stream skipped comprises a predetermined video duration.

10. A system as in claim 6, wherein the portion of the video stream skipped comprises a video duration determined from a video lag.

11. A system as in claim 1, wherein the portion of the video stream skipped comprises a video duration to achieve a predetermined video lead time.

12. A system as in claim 1, wherein the lead criterion comprises a predetermined video lead time.

13. A system as in claim 1, wherein the lead criterion comprises a video lead time determined from a video lag time.

14. A system as in claim 1, wherein the lead criterion comprises a video lead time determined from a video lag rate.

15. A system as in claim 1, wherein the lead criterion comprises a video lead time determined from a time until the next intra frame.

16. A system as in claim 1, wherein the lead criterion based at least in part on an average time between intra frames.

17. A method comprising:
   determining a lead criterion, wherein the lead criterion comprises a negative synchronization offset that places video processing ahead of an associated audio processing of a media data stream;
   video processing a current intra frame from the media data stream with the lead criterion with respect to an associated audio processing of the media data stream, wherein the media data stream includes at least one inter frame between the current intra frame and a future intra frame;
   determining that video processing of the media data stream at a current video processing rate reached a lag criterion with respect to the associated audio processing of the media data stream, wherein the lag criterion comprises a positive synchronization offset that places the video processing behind the associated audio processing of the media data stream;
   determining an advance intra frame processing time, wherein the determining of the advance intra frame processing time comprises:
      determining an average time between two consecutive intra frames;
      determining a video lag rate relating to a video processing rate and an audio processing rate; and
      calculating the advance intra frame processing time as the video lag rate times half the average time between two consecutive intra frames;
   skipping video processing of a portion of the media data stream such that video processing recovers the lead criterion with respect to the associated audio processing of the media data stream, wherein the video processing portion of the media data stream skipped is up to the next intra frame so that the next intra frame is processed ahead of the associated audio processing by the advance intra frame processing time, wherein the skipping of the video processing is performed at a time before a next intra frame, wherein the video processing recovers the lead criterion without a corresponding adjustment to the current video processing rate, and wherein the skipped portion of the media data stream includes at least one unprocessed inter frame before the future intra frame; and
   video processing the future intra frame.

18. A computer program product, the computer program product being embodied in a non-transitory computer readable storage medium and comprising computer instructions for:
   determining a lead criterion, wherein the lead criterion comprises a negative synchronization offset that places video processing ahead of an associated audio processing of a media data stream;
   video processing a current intra frame from the media data stream with the lead criterion with respect to an associated audio processing of the media data stream, wherein the media data stream includes at least one inter frame between the current intra frame and a future intra frame;
   determining that video processing of the media data stream at a current video processing rate reached a lag criterion with respect to the associated audio processing of the media data stream, wherein the lag criterion comprises a positive synchronization offset that places the video processing behind the associated audio processing of the media data stream;
   determining an advance intra frame processing time, wherein the determining of the advance intra frame processing time comprises:
      determining an average time between two consecutive intra frames;
      determining a video lag rate relating to a video processing rate and an audio processing rate; and
      calculating the advance intra frame processing time as the video lag rate times half the average time between two consecutive intra frames;
   skipping video processing of a portion of the media data stream such that video processing recovers the lead criterion with respect to the associated audio processing of the media data stream, wherein the video processing portion of the media data stream skipped is up to the next intra frame so that the next intra frame is processed ahead of the associated audio processing by the advance intra frame processing time, wherein the skipping of the video processing is performed at a time before a next intra frame, wherein the video processing recovers the lead criterion without a corresponding adjustment to the current video processing rate, and wherein the skipped portion of the media data stream includes at least one unprocessed inter frame before the future intra frame; and
   video processing the future intra frame.

19. A system as in claim 1, further comprising:
   determine whether a future video frame buffer size is capable of storing all video frames from the frame currently being processed to the frame ahead of the frame intended to be processed at the current time by the advance intra frame processing time; and
   in the event that the future video frame buffer size is not capable of storing all video frame buffer size to be capable of storing all video frames from the frame currently being frames from the frame currently being processed to the frame ahead of the frame intended to be processed at the current time by the advance intra frame processing time, adjust the future video processed to the frame ahead of the frame intended to be processed at the current time by the advance intra frame processing time.

* * * * *